(12) United States Patent
Kitamoto (10) Patent No.: US 8,525,451 B2
(45) Date of Patent: Sep. 3, 2013

(54) MOTOR CONTROL DEVICE, ELECTRIC POWER STEERING SYSTEM, AND VEHICLE STEERING SYSTEM

(75) Inventor: Hiroshi Kitamoto, Toyota (JP)

(73) Assignee: JTEKT Corporation, Osaka (JP)

( * ) Notice: Subject to any disclaimer, the term of this patent is extended or adjusted under 35 U.S.C. 154(b) by 186 days.

(21) Appl. No.: 12/942,281

(22) Filed: Nov. 9, 2010

(65) Prior Publication Data

US 2011/0115289 A1 May 19, 2011

(30) Foreign Application Priority Data

Nov. 16, 2009 (JP) ................................ 2009-261245

(51) Int. Cl.
*H02P 1/00* (2006.01)
*H02P 3/00* (2006.01)
*H02P 5/00* (2006.01)
*H02P 7/00* (2006.01)

(52) U.S. Cl.
USPC .................. 318/255; 318/400.21; 318/400.22

(58) Field of Classification Search
USPC ................................ 318/255, 400.21, 400.22
See application file for complete search history.

(56) References Cited

U.S. PATENT DOCUMENTS

| | | | | |
|---|---|---|---|---|
| 5,920,174 A | * | 7/1999 | Kawada et al. | 318/663 |
| 6,727,669 B2 | * | 4/2004 | Suzuki et al. | 318/139 |
| 7,005,813 B2 | * | 2/2006 | Xi | 318/400.29 |
| 8,159,166 B2 | * | 4/2012 | Koike | 318/400.21 |
| 2005/0258792 A1 | | 11/2005 | Matsuda et al. | |

FOREIGN PATENT DOCUMENTS

| | | |
|---|---|---|
| JP | A-2002-204593 | 7/2002 |
| JP | A-2005-261054 | 9/2005 |
| JP | A-2005-329906 | 12/2005 |
| JP | A-2008-49779 | 3/2008 |
| JP | A-2008-279953 | 11/2008 |
| JP | A-2008-296829 | 12/2008 |
| JP | A-2009-196389 | 9/2009 |
| JP | A-2009-220766 | 10/2009 |

OTHER PUBLICATIONS

Japanese Office Action mailed Sep. 6, 2011 issued in Japanese Patent Application No. 2009-261245 (with translation).
European Search Report dated Mar. 10, 2011 issued in European Patent Application No. 10191143.6.

* cited by examiner

*Primary Examiner* — Erick Glass
(74) *Attorney, Agent, or Firm* — Oliff & Berridge, PLC (57) ABSTRACT

In a motor control device that is used for, for example, an electric power steering system or another vehicle steering system equipped with a motor, a relay circuit (40) that serves as a power supply breaker is provided in a power feed line (Lp2) of a pre-driver (22) of a circuit that is a component of the motor control device. The operation of the relay circuit (40) is controlled by a relay signal (S_rly) output from a microcomputer (21).

12 Claims, 7 Drawing Sheets

MOTOR CONTROL DEVICE, ELECTRIC POWER STEERING SYSTEM, AND VEHICLE STEERING SYSTEM

INCORPORATION BY REFERENCE

The disclosure of Japanese Patent Application No. 2009-261245 filed on Nov. 16, 2009 including the specification, drawings and abstract, is incorporated herein by reference in its entirety.

BACKGROUND OF THE INVENTION

1. Field of the Invention

The invention relates to a motor control device, an electric power steering system, and a vehicle steering system.

2. Description of the Related Art

In a system that requires high reliability and safety, such as an electric power steering (EPS) system and a vehicle steering system equipped with a transmission ratio variable mechanism, a relay is provided in a power line that connects a driving circuit that constitutes a motor control device of such a system to a power supply. For example, see Japanese Patent Application Publication No. 2009-220766 (JP-A-2009-220766). When there occurs a situation where overcurrent flows through the power line, that is, for example, when a short-circuit failure in which high-potential side and low-potential side switching elements are turned on at the same time in any one of switching arms that constitute the driving circuit (what is called the arm short circuit) has occurred, the relay is turned off to interrupt the power line so as to cut off the energization, so that it is possible to quickly achieve fail-safe.

In addition, the motor control device includes pre-drivers that respectively output driving signals (gate driving signals) to the driving circuit based on motor control signals output from a control circuit (microcomputer). In the driving circuit, the switching elements are turned on and off based on the driving signals to output driving electric powers indicated by the motor control signals. Thus, in order to ensure further high reliability and safety, it is desirable not only to protect the driving circuit by interrupting the power line as described above but also to protect the pre-drivers and power feed lines of the pre-drivers by taking similar measures against overcurrent.

Figure 7:
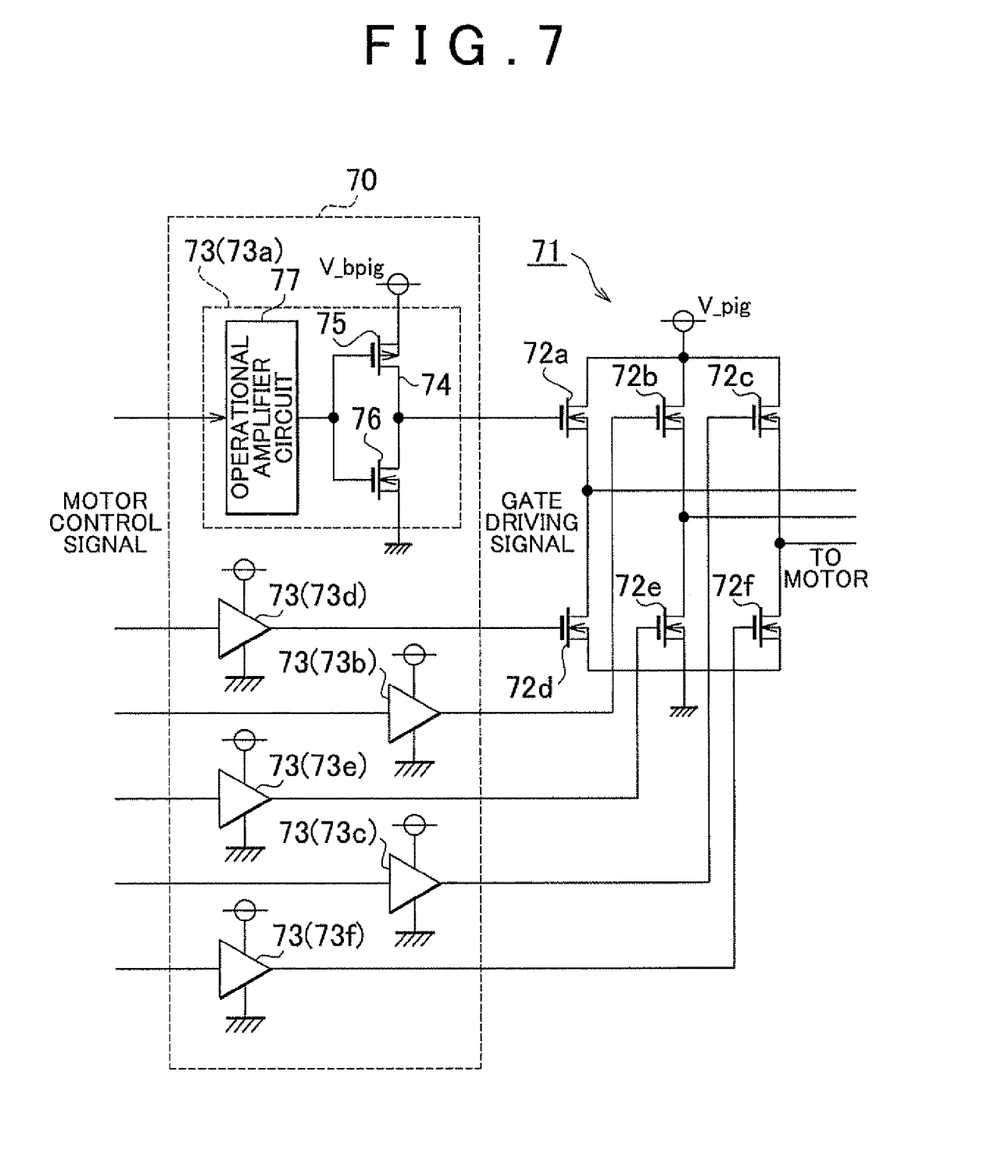
FIG. 7 is a circuit diagram of a pre-driver.

As shown in FIG. 7, normally, a pre-driver 70 includes driver circuits 73 (73a to 73f) corresponding to switching elements (FETs 72a to 72f) of a driving circuit 71. Since a motor control device shown in this example is a brushless motor control device that outputs three-phase (U, V and W) driving electric power, both the number of the switching elements and the number of driver circuits are "6". The FETs 72a to 72f that constitute the driving circuit 71 are turned on and off based on gate driving signals output from the corresponding driver circuits 73a to 73f.

In most cases, each driver circuit 73 includes a push-pull circuit 74 at its output stage. In this example, the push-pull circuit 74 is used, in which a p-channel FET 75 is arranged at a high-potential side and an n-channel FET 76 is arranged at a low-potential side. The push-pull circuit 74 inverts the output of an operational amplifier circuit (inverting amplifier circuit) 77 that is a driver unit of the driver circuit 73, and then outputs the inverted output of the operational amplifier circuit 77 to a corresponding one of the FETs 72a to 72f of the driving circuit 71.

That is, each driver circuit 73 of the pre-driver 70 amplifies the motor control signal based on the applied voltage to thereby output the gate driving signal to a corresponding one of the FETs 72a to 72f of the driving circuit 71. Thus, for example, if a short-circuit failure occurs in any one of the push-pull circuits 74, overcurrent may flow through the pre-driver 70 and the power feed line thereof as in the case where a short-circuit failure occurs in the driving circuit 71 as described above.

However, unlike the driving circuit 71 and the power line thereof, in the case of the pre-driver 70 and the power feed line thereof, large current does not flow basically while the pre-driver 70 and the power feed line operate normally. Thus, it is extremely less likely that a short-circuit failure occurs inside the pre-driver 70. For this reason, in the existing art, it is less necessary to take measures against overcurrent in the pre-driver and the power feed line thereof.

In the meantime, there is a motor control device that is configured to apply a voltage, stepped up by a step-up circuit, to a pre-driver. For example, see JP-A-2009-220766. By employing a configuration, in which a step-up voltage is applied to the pre-driver, for example, the response of an EPS is improved in a case where an energization direction is switched, for example, when the right or left steering direction is reversed.

However, by increasing the applied voltage as described above, the possibility increases that a short-circuit failure occurs inside the pre-driver. Furthermore, when a smoothing capacitor is provided at the output stage of the step-up circuit, a possibility additionally occurs that a ground fault occurs in the capacitor. Thus, in the above configuration, in which a step-up voltage is applied to the pre-driver, the possibility that overcurrent occurs in the pre-driver is non-negligible, and there is a strong need for effective measures against overcurrent.

SUMMARY OF INVENTION

An object of the invention is to provide a motor control device, an electric power steering system equipped with the motor control device, and a vehicle steering system, with which it is possible to solve the above problem.

A motor control device that is an aspect of the invention includes: a driving circuit that is formed by connecting a plurality of switching elements; a motor control signal output device that outputs a motor control signal; a step-up circuit that steps up and outputs a power supply voltage; and a pre-driver that outputs a driving signal corresponding to the motor control signal to each of the switching elements based on the step-up voltage output by the step-up circuit. The step-up circuit is provided in a power feed line of the pre-driver, branching off from a power line that connects the driving circuit and a power supply, and a power supply breaker capable of being controlled to interrupt the power feed line so as to cut off the energization, is provided in the power feed line.

With the above configuration, even when there occurs a situation where overcurrent flows through the pre-driver and the power feed line, it is possible to quickly interrupt the power feed line so as to cut off the energization to thereby eliminate the influence of the overcurrent on the circuit. As a result, higher reliability is ensured.

For example, when a fuse is provided in the power feed line, the fuse also has a function of interrupting the power feed line so as to cut off the energization. However, interruption by the fuse requires time until the fuse is melted by the passage of overcurrent. Thus, by providing the power supply breaker of which the operation can be controlled, it becomes possible to eliminate the influence of overcurrent on the circuit more effectively.

In addition, a factor that causes overcurrent to occur in the power line that connects the driving circuit and the power supply may be a short-circuit failure in which both the high-potential side and low-potential side switching elements of any one of series circuits of switching element pair (switching arms) that constitute the driving circuit are turned on at the same time (what is called the arm short circuit). Most of such arm short circuits occur because the status of any one of the driving signals input to the switching elements gets stuck in active. In general, the driving circuit is configured to be "Hi active" in which each of the switching elements is turned on when the signal level of the input driving signal is "Hi". Thus, by stopping supply of electric power to the pre-driver that outputs the respective driving signals to deactivate the statuses of the driving signals, it is possible to turn off all the switching elements.

With the above configuration, the power feed line is interrupted so as to cut off the energization even in the case of occurrence of such an arm short circuit, so that it is possible to effectively eliminate the influence on the circuit due to overcurrent flowing through the power line of the driving circuit because of the arm short circuit. As a result, the relay circuit provided in the power line may be omitted. Particularly, unlike the power line, there is no need to pass a large current through the power feed line of the pre-driver. Thus, also in the case where the configuration is employed, in which the relay circuit is provided in the power feed line, it is possible to greatly reduce the size and cost as compared with the existing configuration, in which the relay circuit is provided in the power line.

The motor control device according to the above aspect may be installed in an electric power steering system. With the above configuration, it is possible to provide an electric power steering system having a simple configuration and high reliability.

The motor control device according to the above aspect may be installed in a vehicle steering system that drives a steering system using a motor. With the above configuration, it is possible to provide a vehicle steering system having a simple configuration and high reliability.

BRIEF DESCRIPTION OF DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Hereinafter, an electric power steering (EPS) system according to a first embodiment of the invention will be described with reference to the accompanying drawings.

Figure 1:
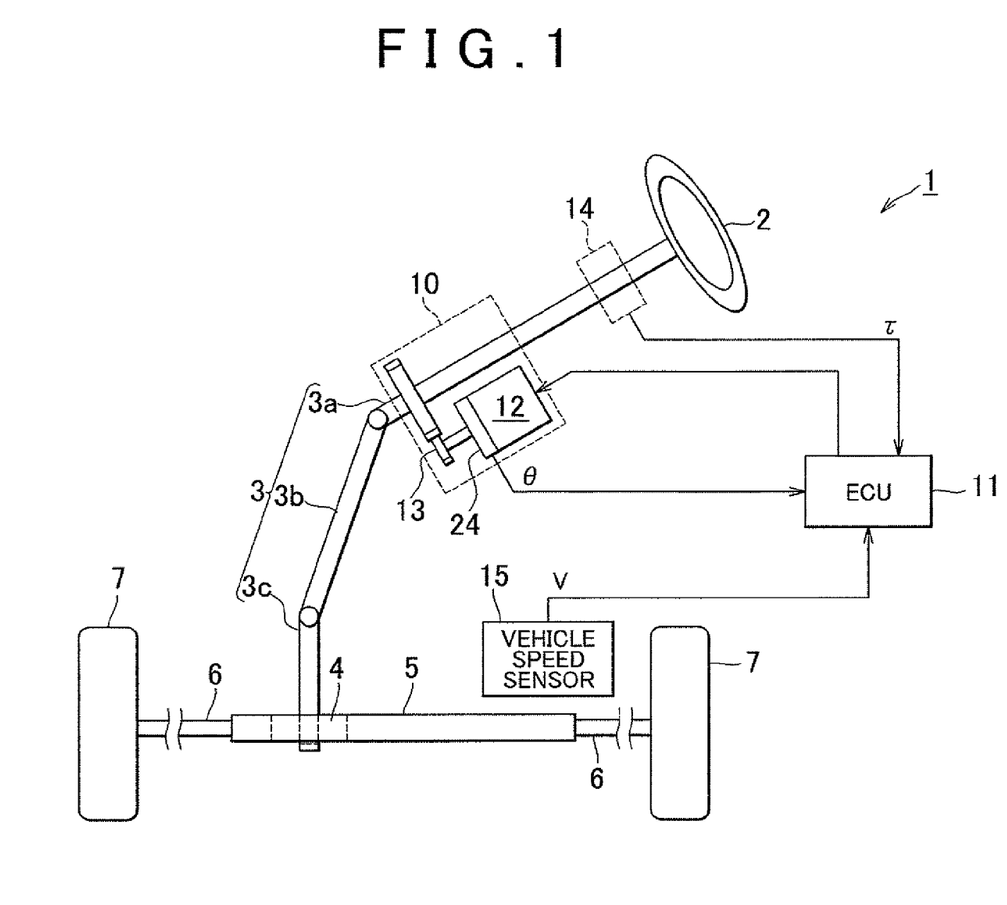
FIG. 1 is a schematic configuration diagram of an electric power steering (EPS) system.

As shown in FIG. 1, the electric power steering (EPS) system 1 according to the present embodiment includes a steering shaft 3 to which a steering wheel 2 is fixed. The steering shaft 3 is coupled to a rack shaft 5 via a rack-and-pinion mechanism 4. Rotation of the steering shaft 3 resulting from steering operation is converted to reciprocal linear motion of the rack shaft 5 by the rack-and-pinion mechanism 4. The steering shaft 3 is formed by coupling a column shaft 3a, an intermediate shaft 3b, and a pinion shaft 3c. The reciprocal linear motion of the rack shaft 5 resulting from the rotation of the steering shaft 3 is transmitted to knuckles (not shown) via tie rods 6 coupled at both ends of the rack shaft 5. This changes the steered angles of steered wheels 7, that is, the traveling direction of a vehicle.

In addition, the EPS 1 includes an EPS actuator 10 and an electronic control unit (ECU) 11. The EPS actuator 10 serves as a steering force assisting device and applies assist force for assisting steering operation to a steering system. The ECU 11 serves as a controller that controls the EPS actuator 10.

The EPS actuator 10 is a column assist-type EPS actuator in which a motor 12 that serves as a driving source is coupled to the column shaft 3a via a reduction mechanism 13. The EPS actuator 10 drives the column shaft 3a for rotation by the motor torque to thereby apply assist force to the steering system.

On the other hand, a torque sensor 14 and a vehicle speed sensor 15 are connected to the ECU 11. The ECU 11 computes assist force to be applied to the steering system (target assist force) based on a steering torque $\tau$ and a vehicle speed V detected by the torque sensor 14 and the vehicle speed sensor 15. The ECU 11 computes the target assist force so as to apply larger assist force to the steering system as the absolute value of the detected steering torque $\tau$ increases or as the vehicle speed V decreases. In order to generate a motor torque corresponding to the target assist force, the ECU 11 supplies driving electric power to the motor 12 that serves as the driving source to control the operation of the EPS actuator 10, that is, assist force applied to the steering system.

Figure 2:
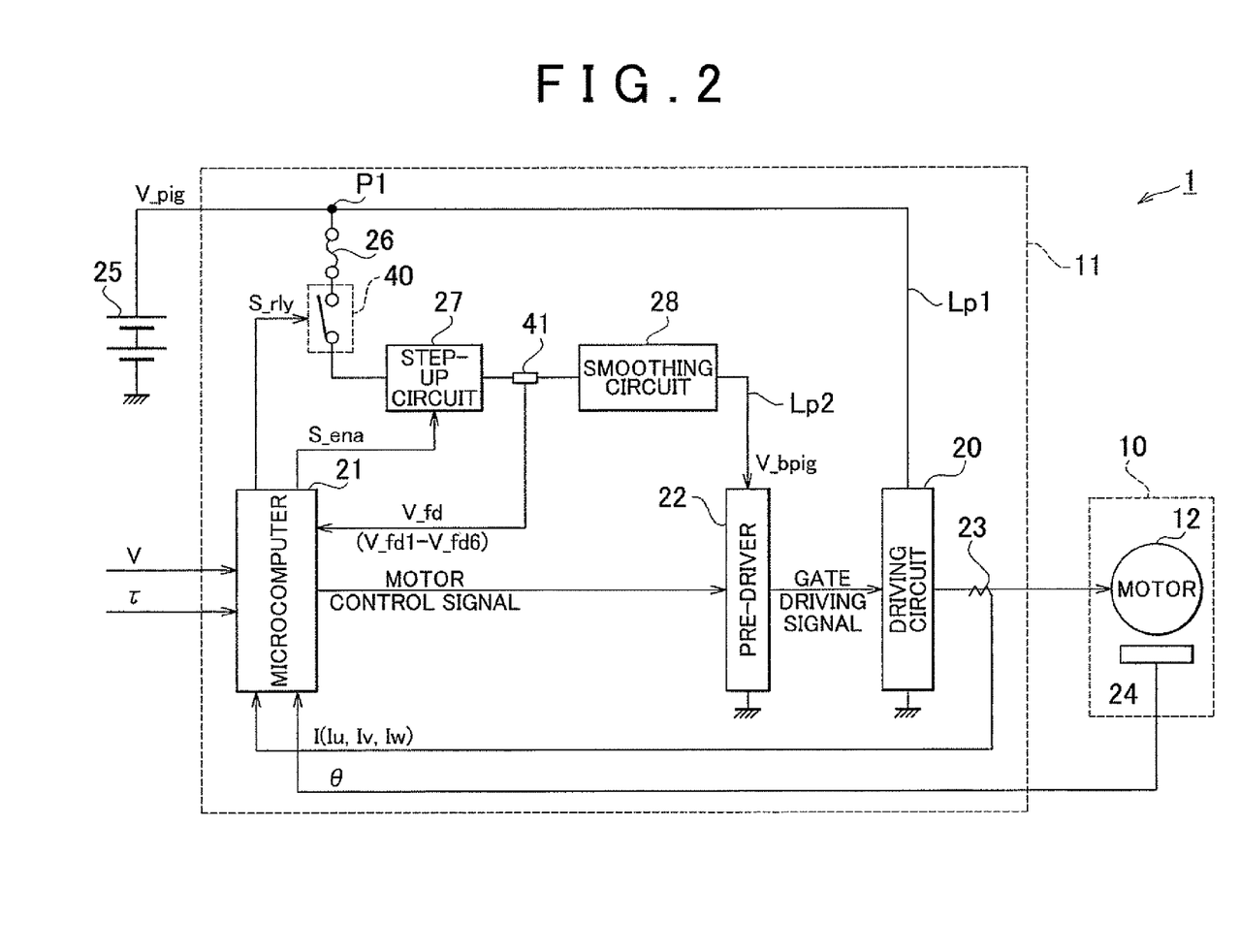
FIG. 2 is a block diagram that shows an electrical configuration of the EPS.

Next, the electrical configuration of the EPS system according to the present embodiment will be described. As shown in FIG. 2, the ECU 11 includes a driving circuit 20, a microcomputer 21, and a pre-driver 22. The driving circuit 20 is formed by connecting a plurality of switching elements (FETs). The microcomputer 21 serves as a motor control signal output device. The pre-driver 22 outputs a gate driving signal to each switching element of the driving circuit 20 based on the motor control signal output from the microcomputer 21.

The steering torque $\tau$ and the vehicle speed V detected by the torque sensor 14 and the vehicle speed sensor 15 are input to the microcomputer 21 of the ECU 11. The microcomputer 21 computes a target assist force based on these steering torque $\tau$ and vehicle speed V, and then outputs motor control signals for controlling the motor 12 in order to generate a motor torque corresponding to the target assist force.

Actual current values I of the motor 12, detected by a current sensor 23, and a rotation angle $\theta$ of the motor 12, detected by a motor resolver 24, are input to the microcomputer 21. Then, the microcomputer 21 executes current feedback control to generate motor control signals in order for the actual current values I to follow a current command value corresponding to the motor torque to be generated by the motor 12.

In addition, a voltage based on a power supply voltage V_pig of an in-vehicle power supply 25 is applied to the driving circuit 20 and the pre-driver 22. Specifically, a power supply voltage V_pig is applied to the driving circuit 20 via a power line Lp1. On the other hand, a power feed line Lp2 of the pre-driver 22 is connected so as to branch off from the power feed line Lp1. A fuse 26 is provided in the power feed line Lp2 near a node P1 at which the power feed line Lp2 is connected to the power line Lp1. A step-up circuit 27 is provided in the power feed line Lp2. The step-up circuit 27 steps up and outputs the power supply voltage V_pig when an enable signal S_ena output from the microcomputer 21 is active. Note that the microcomputer 21 activates the enable signal S_ena output to the step-up circuit 27 when an ignition switch of the vehicle is turned on. A smoothing circuit 28 is provided between the step-up circuit 27 and the pre-driver 22. A step-up voltage V_bpig that is stepped up by the step-up circuit 27 is applied to the pre-driver 22.

The pre-driver 22 amplifies the motor control signal based on the applied step-up voltage V_bpig to thereby output a gate driving signal to each switching element that constitutes the driving circuit 20. Then, in the driving circuit 20, each switching element is turned on and off based on the gate driving signal, whereby the driving electric power, indicated by the motor control signals output from the microcomputer 21, is output to the motor 12 based on the applied power supply voltage V_pig.

Figure 3:
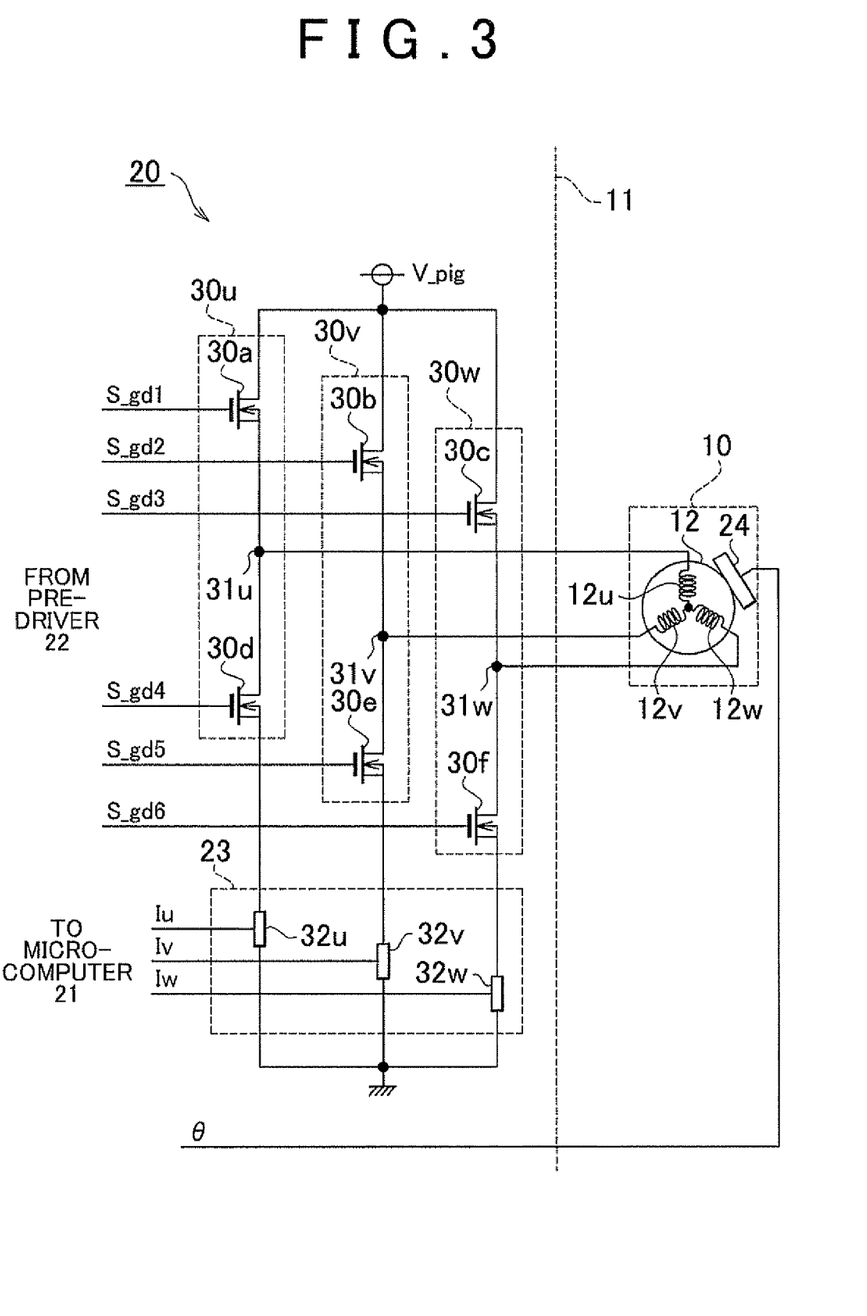
FIG. 3 is a circuit diagram of a driving circuit.

More specifically, as shown in FIG. 3, a brushless motor is employed as the motor 12 that serves as the driving source of the EPS actuator 10. The brushless motor is rotated with three-phase (U, V and W) driving electric power supplied thereto. The driving circuit 20 is configured as a known PWM inverter, in which two switching elements connected in series with each other are used as an elemental unit (switching arm) and three switching arms 30u, 30v and 30w corresponding to the respective phases are connected in parallel with one another.

In the driving circuit 20, the switching arms 30u, 30v, and 30w are formed by connecting the respective switching element pairs of the FETs 30a and 30d, FETs 30b and 30e, and FETs 30c and 30f in series. A node 31u between the FETs 30a and 30d, a node 31v between the FETs 30b and 30e, and a node 31w between the FETs 30c and 30f respectively serve as output units corresponding to motor coils 12u, 12v, and 12w of the respective phases.

The current sensor 23 is formed by connecting shunt resistors 32u, 32v, and 32w to the low-potential sides (ground sides, or the lower sides in FIG. 3) of these switching arms 30u, 30v, and 30w, respectively. By so doing, the microcomputer 21 detects current values Iu, Iv, and Iw of the respective phases as actual current values I of the motor 12.

Figure 4:
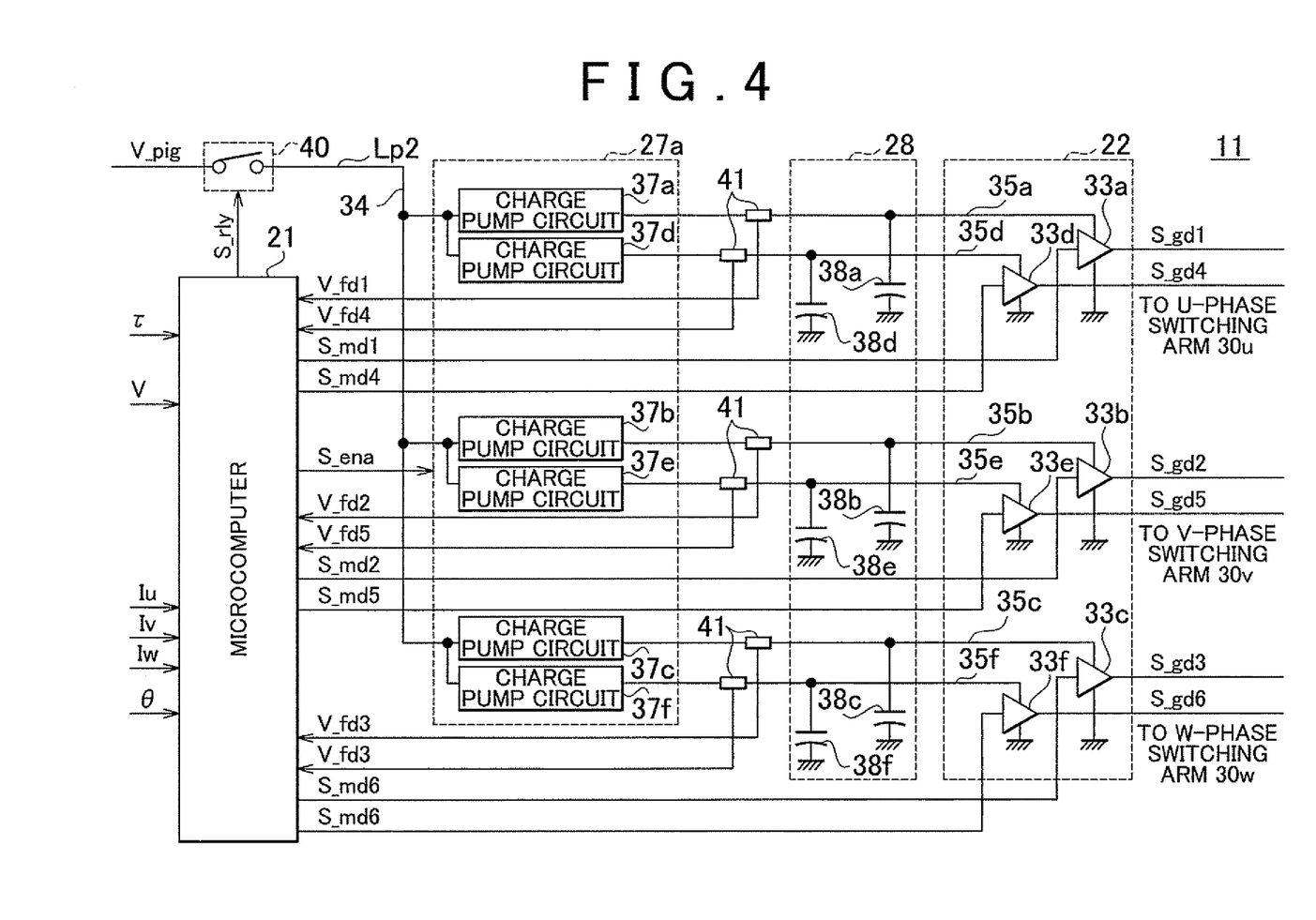
FIG. 4 is a circuit diagram (a portion related to a pre-driver) of an ECU according to a first embodiment.

As shown in FIG. 4, the pre-driver 22 includes driver circuits 33a to 33f corresponding to the FETs 30a to 30f that constitute the driving circuit 20. The power feed line Lp2 of the pre-driver 22 is formed of a main line 34 and a plurality of branch lines 35a to 35f. The main line 34 branches off from the power line Lp1 of the driving circuit 20 at the node P1 (see FIG. 2). The plurality of branch lines 35a to 35f branch off from the main line 34, associated with the driver circuits 33a to 33f. The step-up circuit 27 is formed of charge pump circuits 37a to 37f provided in these branch lines 35a to 35f, respectively. In addition, the smoothing circuit 28 is formed of capacitors 38a to 38f of which one ends are grounded.

Step-up voltages V_bpig that are stepped up by the corresponding charge pump circuits 37a to 37f and that are smoothed by the capacitors 38a to 38f are respectively applied to the driver circuits 33a to 33f that constitute the pre-driver 22. In the present embodiment, electrolytic capacitors are used as the capacitors 38a to 38f. Motor control signals for controlling the operations of the switching arms 30u, 30v, and 30w corresponding to the driver circuits 33a to 33f are input from the microcomputer 21 to the driver circuits 33a to 33f. The driver circuits 33a to 33f respectively amplify the input motor control signals S_md1 to S_md6 based on the applied step-up voltage V_bpig to thereby output gate driving signals S_gd1 to S_gd6 to the corresponding FETs 30a to 30f.

In the driving circuit 20, the FETs 30a to 30f are turned on and off in response to these gate driving signals S_gd1 to S_gd6 to thereby change the pattern of energizing the motor coils 12u, 12v, and 12w of the respective phases. By so doing, the driving circuit 20 generates three-phase (U, V, and W) driving electric power based on the applied power supply voltage V_pig, and outputs the generated driving electric power to the motor 12.

As shown in FIG. 2 and FIG. 4, a relay circuit 40 is provided in the power feed line Lp2 of the pre-driver 22. The relay circuit 40 serves as a power supply breaker. The operation of the relay circuit 40 is controlled by a relay signal S_rly output from the microcomputer 21.

Specifically, when the input relay signal S_rly is active, the relay circuit 40 is turned on to allow energization through the power feed line Lp2; whereas, when the relay signal S_rly is inactive, the relay circuit 40 is turned off to interrupt the power feed line Lp2 so as to cut off the energization. By providing the relay circuit 40 in the main line 34 of the power feed line Lp2, it is possible to interrupt the power feed line Lp2 so as to cut off the energization independently of the power line Lp1 of the driving circuit 20 connected to the power feed line Lp2 at the node P1.

In the present embodiment, a semiconductor relay is used as the relay circuit 40. In addition, the relay signal S_rly is active when the signal level is "Hi", and the relay signal S_rly is inactive when the signal level is "Lo". The microcomputer 21 activates the relay signal S_rly output to the relay circuit 40 when the ignition switch of the vehicle is turned on.

Voltage sensors 41 are provided in the power feed line Lp2 between the step-up circuit 27 and the smoothing circuit 28. Each voltage sensor 41 has a known configuration that uses the divided voltage of a series resistor circuit as the sensor output. More specifically, one voltage sensor 41 is provided in each of the branch lines 35a to 35f. When any one of voltages V_fd (V_fd1 to V_fd6) detected by these voltage sensors 41 is lower than or equal to a predetermined threshold Vth set with respect to a ground voltage, the microcomputer 21 deactivates the relay signal S_rly output to the relay circuit 40 (S_rly Lo) in order to interrupt the power feed line Lp2 so as to cut off the energization.

As described above, when there occurs a short-circuit failure (ground fault) inside any one of the driver circuits 33a to 33f that constitute the pre-driver 22 or a ground fault in any one of the capacitors 38a to 38f that constitute the smoothing circuit 28, theoretically, a voltage on the power supply side with respect to the any one of the capacitors 38a to 38f also becomes the ground voltage. In the present embodiment, in such a case, the power feed line Lp2 is quickly interrupted so as to cut off the energization to thereby remove the influence on the circuit due to overcurrent flowing through the power feed line Lp2 because of the short-circuit failure.

Furthermore, when there occurs a short-circuit failure that on both the high-potential and low-potential sides, the FETs 30a and 30d, FETs 30b and 30e, or FETs 30c and 30f of any one of the switching arms 30u, 30v, and 30w that constitute the driving circuit 20 are turned on at the same time (what is called the arm short circuit), the microcomputer 21 functions as a detector that detects the arm short circuit. When any one of the current values Iu, Iv, and Iw of the respective phases, detected as actual current values I of the motor 12 by the current sensor 23 formed by connecting the shunt resistors 32u, 32v, and 32w to the low-potential sides of the switching arms 30u, 30v, and 30w, is larger than or equal to a predetermined threshold Ith, it is determined that the arm short circuit has occurred in that phase. Even when the microcomputer 21 has detected an arm short circuit, the microcomputer 21 deactivates the relay signal S_rly output to the relay circuit 40.

In general, an n-channel FET is used as each of the FETs 30a to 30f that constitute the driving circuit 20. The n-channel FET is turned on when the signal level of the input gate driving signal is "Hi". There is an extremely low possibility that both of the pair of switching elements (FETs 30a and 30d, FETs 30b and 30e, or FETs 30c and 30f) that constitute any one of the switching arms 30u, 30v, and 30w short-circuit at the same time.

That is, most of the above described arm short circuits occur because the signal level of any one of the gate driving signals S_gd1 to S_gd6 input to the respective FETs 30a to 30f gets stuck in "Hi". Thus, supply of electric power to the pre-driver 22 that outputs the gate driving signals S_gd1 to S_gd6 is stopped to set the signal level of each of the gate driving signals S_gd1 to S_gd6 to "Lo" to thereby make it possible to turn off all the FETs 30a to 30f. In the present embodiment, this is used to interrupt the power feed line Lp2 so as to cut off the energization even in the case of such an arm short circuit to thereby eliminate the influence on the circuit due to overcurrent flowing through the power line Lp1 of the driving circuit 20 because of the arm short circuit.

Figure 5:
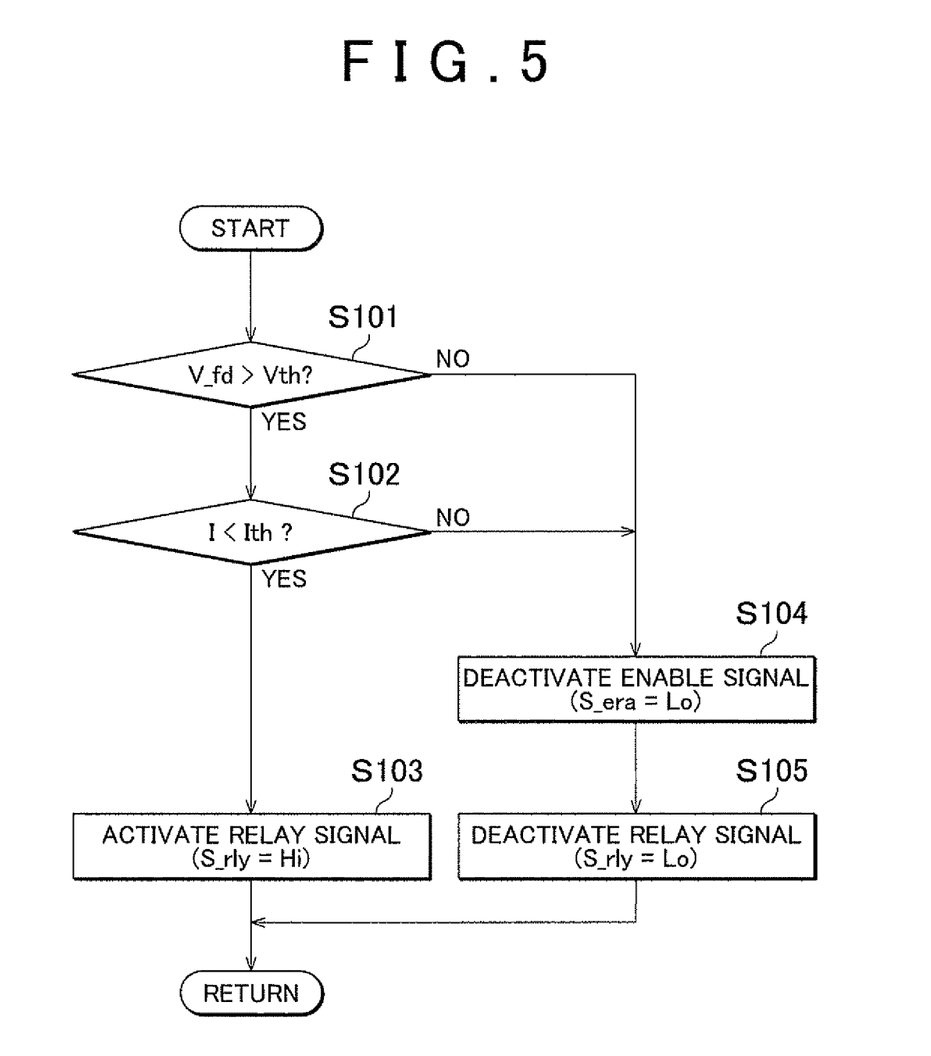
FIG. 5 is a flowchart that shows the procedure of overcurrent prevention control.

Next, a mode of overcurrent prevention control executed by the microcomputer according to the present embodiment will be described. As shown in the flowchart of FIG. 5, the microcomputer 21 initially determines whether the voltages V_fd detected by the respective voltage sensors 41, more specifically, the detected voltages V_fd1 to V_fd6 of the respective branch lines 35a to 35f, are higher than the predetermined threshold Vth set with respect to the ground voltage (step 101). Subsequently, when the voltages V_fd detected by the voltage sensors 41 are higher than the threshold Vth in step 101 (V_fd>Vth, YES in step 101), the microcomputer 21 determines whether the actual current values I detected by the current sensor 23 are smaller than the predetermined threshold Ith (step 102). Specifically, it is determined whether the current values Iu, Iv, and Iw of the respective phases, detected at the low-potential sides of the switching arms 30u, 30v, and 30w, are smaller than the predetermined threshold Ith. When the actual current values I are smaller than the predetermined threshold Ith in step 102 (I<Ith, YES in step 102), the microcomputer 21 continues to activate the relay signal S_rly output to the relay circuit 40 (S_rly=Hi, step 103).

On the other hand, when any one of the voltages V_fd detected by the respective voltage sensors 41 is lower than or equal to the threshold Vth in step 101 (V_fd≦Vth, NO in step 101), the microcomputer 21 first deactivates the enable signal S_ena output to the step-up circuit 27 (step 104). Then, the relay signal S_rly output to the relay circuit 40 is deactivated (S_rly=Lo), and the relay circuit 40 is controlled in order to interrupt the power feed line Lp2 of the pre-driver 22 so as to cut off the energization (step 105).

Similarly, when any one of the actual current values I detected by the current sensor 23 is larger than or equal to the predetermined threshold Ith (I≧Ith, NO in step 102), the microcomputer 21 deactivates the enable signal S_ena output to the step-up circuit 27 (step 104). Similarly, the relay signal S_rly output to the relay circuit 40 is deactivated (S_rly=Lo) to control the relay circuit 40 in order to interrupt the power feed line Lp2 of the pre-driver 22 so as to cut off the energization (step 105).

As described above, according to the present embodiment, the following advantageous effects are obtained.

1) The relay circuit 40 that serves as the power supply breaker is provided in the power feed line Lp2 of the pre-driver 22. The operation of the relay circuit 40 is controlled by the relay signal S_rly output from the microcomputer 21.

With the above configuration, even when there occurs a situation where overcurrent flows through the pre-driver 22 and the power feed line Lp2, it is possible to quickly interrupt the power feed line Lp2 so as to cut off the energization to thereby eliminate the influence of the overcurrent on the circuit.

Note that the fuse 26 provided in the power feed line Lp2 also has a function of interrupting the power feed line Lp2 so as to cut off the energization. However, interruption by the fuse 26 requires time until the fuse 26 is melted by the passage of overcurrent. Thus, the relay circuit 40 of which the operation can be controlled is able to eliminate the influence of overcurrent on the circuit more effectively.

In addition, a factor that causes overcurrent to occur in the power line Lp1 that connects the driving circuit 20 and the in-vehicle power supply 25 may be a short-circuit failure in which both the high-potential side and low-potential side switching elements of any one of the switching arms 30u, 30v, and 30w that constitute the driving circuit 20 are turned on at the same time (what is called the arm short circuit). However, most of such arm short circuits occur because the signal level of any one of the gate driving signals S_gd1 to S_gd6 input to the respective switching elements (FETs 30a to 301) gets stuck in "Hi". Thus, supply of electric power to the pre-driver 22 that outputs the gate driving signals S_gd1 to S_gd6 is stopped to set the signal level of each of the gate driving signals S_gd1 to S_gd6 to "Lo", whereby it is possible to turn off all the FETs 30a to 30f.

That is, when the above configuration is employed and the power feed line Lp2 is interrupted so as to cut off the energization even in the case of such an arm short circuit, it is possible to effectively eliminate the influence on the circuit due to overcurrent flowing through the power line Lp1 of the driving circuit 20 because of the arm short circuit. As a result, the relay circuit provided in the power line Lp1 may be omitted. Here, unlike the power line Lp1, there is no need to pass a large current through the power feed line Lp2 of the pre-driver 22. Thus, by employing the configuration, in which the relay circuit 40 is provided in the power feed line Lp2, it is possible to greatly reduce the size and cost as compared with the existing configuration, in which the relay circuit is provided in the power line Lp1.

2) The voltage sensors 41 are provided in the power feed line Lp2 between the step-up circuit 27 and the smoothing circuit 28. When any one of the voltages detected by the voltage sensors 41 is lower than or equal to the predetermined threshold Vth set with respect to the ground voltage, the microcomputer 21 controls the relay circuit 40 in order to interrupt the power feed line Lp2 so as to cut off the energization.

That is, when there occurs a short-circuit failure (ground fault) inside the pre-driver 22 or a ground fault in any one of the capacitors 38a to 38f that constitute the smoothing circuit 28, theoretically, a voltage on the power supply side with respect to the any one of the capacitors 38a to 38f also becomes the ground voltage. Thus, with the above configuration, a situation where overcurrent flows through the pre-driver 22 and the power feed line Lp2 is detected further quickly, so that it is possible to quickly interrupt the power feed line Lp2 so as to cut off the energization.

3) When there occurs the arm short circuit in any one of the switching arms 30u, 30v, and 30w that constitute the driving circuit 20, the microcomputer 21 functions as a detector that detects the arm short circuit.

With the above configuration, a situation where overcurrent flows through the driving circuit 20 and the power line Lp1 is detected further quickly, so that it is possible to quickly interrupt the power feed line Lp2 so as to cut off the energization. As a result, it is possible to turn off the FETs 30a to 30f to further effectively eliminate the influence on the circuit due to overcurrent flowing through the power line Lp1 of the driving circuit due to the arm short circuit.

Hereinafter, a second embodiment of the invention will be described with reference to the accompanying drawings. Note that, for the sake of easy description, like reference numerals denote components similar to those of the first embodiment, and the description thereof is omitted.

Figure 6:
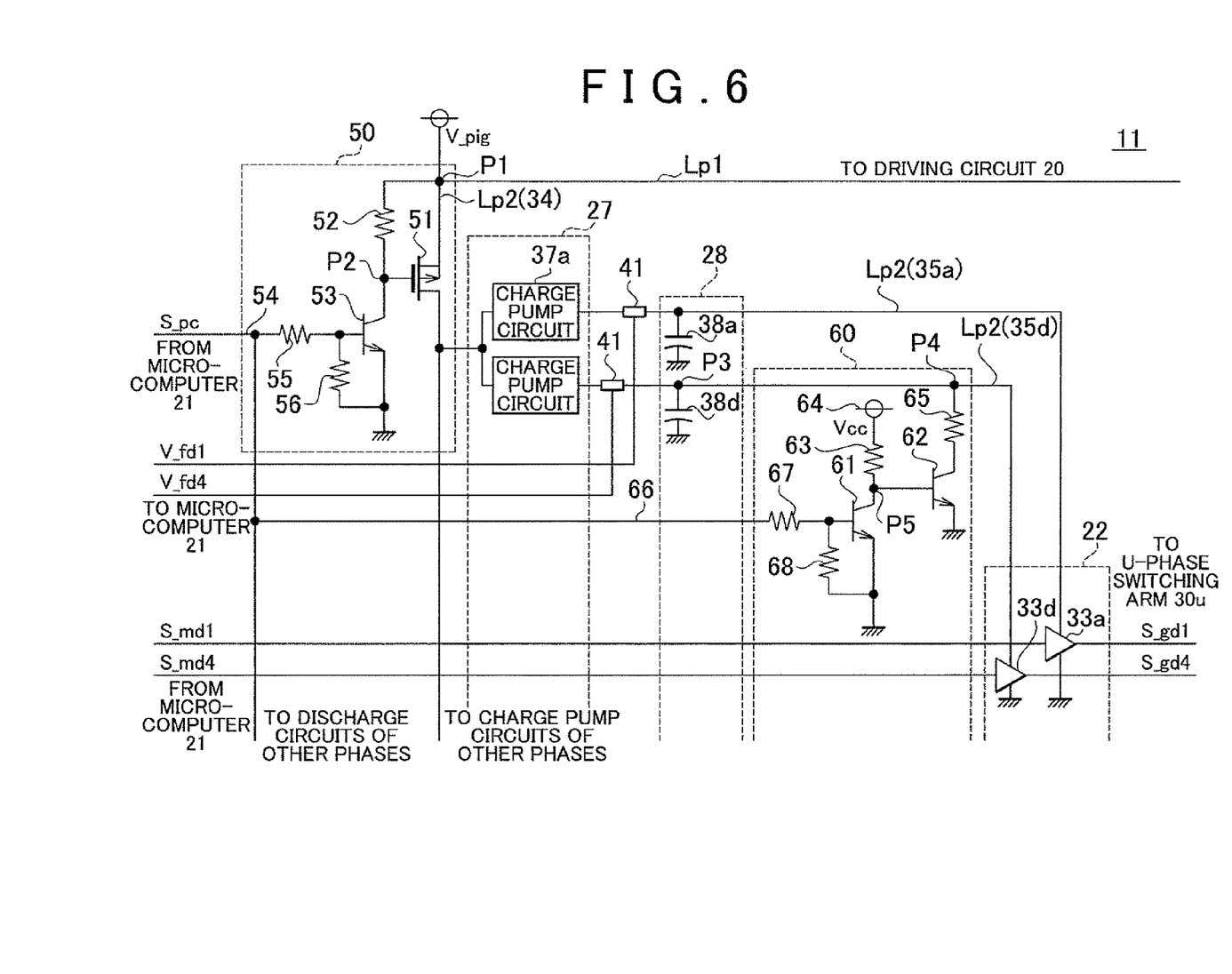
FIG. 6 is a circuit diagram (a portion related to a pre-driver) of an ECU according to a second embodiment.

FIG. 6 is a circuit diagram of an ECU 11 according to the present embodiment. FIG. 6 extracts a power supply unit and a U-phase portion within the circuit formed in the ECU 11 for the sake of easy description.

As shown in the drawing, the present embodiment differs from the first embodiment in the configuration of the power supply breaker. In the present embodiment, in place of the relay circuit 40 that constitutes the power supply breaker in the first embodiment, an energization control circuit 50 is provided in the main line 34 of the power feed line Lp2 of the pre-driver 22.

More specifically, as shown in the drawing, a p-channel FET 51 is provided in the main line 34 of the power feed line Lp2 at a portion near the node P1 at which the power feed line Lp2 is connected to the power line Lp1. In addition, the collector terminal of an npn transistor 53 is connected to the node P1 via a resistor 52. The gate terminal of the p-channel FET 51 is connected to a node P2 at which the resistor 52 is connected to the npn transistor 53, and the emitter terminal of the npn transistor 53 is grounded.

Furthermore, the base terminal of the npn transistor 53 is connected to the microcomputer 21 via a signal line 54. A resistor 55 is provided in the signal line 54, and a pull-down resistor 56 is connected to the signal line 54. An energization control signal S_pc output from the microcomputer 21 is input to the base terminal of the npn transistor 53 via the signal line 54.

That is, when the signal level of the energization control signal S_pc output from the microcomputer 21 is "Hi", the npn transistor 53 is brought to an "on" state. By so doing, the voltage at the node P2 between the npn transistor 53 and the resistor 52 becomes substantially the ground voltage. Thus, the voltage level of the gate voltage of the p-channel FET 51 connected to the node P2 becomes "Lo" to turn on the p-channel FET 51, whereby energization through the power feed line Lp2 is allowed.

On the other hand, when the energization control signal S_pc is "Lo", the npn transistor 53 is brought to an "off" state. By so doing, the voltage at the node P2 becomes a value determined based on the power supply voltage V_pig and a voltage drop due to the resistor 52. Thus, the gate voltage of the p-channel FET 51 connected to the node P2 becomes "Hi" to turn off the p-channel FET 51, whereby the power feed line Lp2 is interrupted so as to cut off the energization.

Note that, in the present embodiment as well, as in the case of the first embodiment, the microcomputer 21 sets the signal level of the energization control signal S_pc output to the npn transistor 53 that constitutes the energization control circuit 50 to "Hi" corresponding to an active state when the ignition switch of the vehicle is turned on. When there occurs a short-circuit failure (ground fault) inside the pre-driver 22, a ground fault in any one of the capacitors 38a to 38f that constitute the smoothing circuit 28, or an arm short circuit in any one of the switching arms 30u, 30v, and 30w that constitute the driving circuit 20, the signal level of the energization control signal S_pc to be output is set to "La" corresponding to the active state (see FIG. 2 to FIG. 4).

In addition, the ECU 11 further includes a discharge circuit 60. The discharge circuit 60 discharges the capacitors that constitute the smoothing circuit 28 when the energization control circuit 50 serving as the power supply breaker interrupts the power feed line Lp2 of the pre-driver 22 so as to cut off the energization as described above.

More specifically, the discharge circuit 60 is configured to be able to discharge capacitors 38d, 38e, and 38f connected respectively to the low-potential side branch lines 35d, 35e, and 35f, that is, capacitors connected to the branch lines associated with the low-potential side FETs 30d, 30e, and 30f and driver circuits 33d, 33e, and 33f (see FIG. 3 and FIG. 4).

The circuit configurations for discharging the capacitors connected to the low-potential side branch lines are the same among the U-phase, V-phase, and W-phase. Thus, hereinafter, for the sake of easy description, only the circuit configuration for discharging the U-phase low-potential side capacitor 38d will be described, and the description for the other phases (V-phase and W-phase) is omitted.

As shown in FIG. 6, the discharge circuit 60 includes two npn transistors 61 and 62 for each phase. The emitter terminals of the two npn transistors 61 and 62 are grounded. The collector terminal of the npn transistor 61 is connected to a direct-current power supply 64 via a resistor 63. On the other hand, the collector terminal of the npn transistor 62 is connected to the low-potential side branch line 35d at a node P4 that is lower in potential (ground side) than the node P3 of the capacitor 38d. A discharge resistor 65 is provided between the node P4 and the collector terminal of the npn transistor 62.

A signal line 66 is connected to the base terminal of the npn transistor 61. The signal line 66 branches off from the signal line 54 that connects the energization control circuit 50 and the microcomputer 21. A resistor 67 is provided in the signal line 66 at a portion near the npn transistor 61, and a pull-down resistor 68 is connected to the signal line 66. The base terminal of the npn transistor 62 is connected to a node P5 between the npn transistor 61 and the resistor 63.

When the signal level of the energization control signal S_pc output from the microcomputer 21 is "Hi", the energization control signal S_pc is input to the npn transistor 61 via the signal line 66, so that the npn transistor 61 is brought to an "on" state. By so doing, the voltage at the node P5 between the npn transistor 61 and the resistor 63 becomes substantially the ground voltage, and the voltage level applied to the base terminal of the npn transistor 62 becomes "Lo", so that the npn transistor 62 is brought to an off state. Thus, in a state where the energization control circuit 50 allows energization through the power feed line Lp2, current flowing through the power feed line Lp2 does not flow into the discharge circuit 60.

On the other hand, when the signal level of the energization control signal S_pc output from the microcomputer 21 is "Lo", the energization control signal S_pc is input to the npn transistor 61 through the signal line 66, so that the npn transistor 61 is brought to an "off" state, By so doing, the voltage at the node P5 between the npn transistor 61 and the resistor 63 becomes a value determined based on a control voltage Vcc of the direct-current power supply 64 and a voltage drop due to the resistor 63, and the voltage level applied to the base terminal of the npn transistor 62 is brought to "Hi", so that the npn transistor 62 is brought to an "on" state.

When the npn transistor 62 is brought to an "on" state, the power supply-side terminal of the capacitor 38*d* is grounded via the branch line 35*d* connected to the power supply-side terminal at the node P3, the discharge resistor 65 connected to the branch line 35*d* at the node P4 that is lower in potential than the node P3, and the npn transistor 62. When the power feed line Lp2 is interrupted by the energization control circuit 50 so as to cut off the energization, the discharge circuit 60 is able to discharge the capacitors 38*d*, 38*e*, and 38*f* connected to the respective low-potential side branch lines 35*d*, 35*e*, and 35*f* that constitute the power feed line Lp2.

According to the present embodiment, in addition to the function and advantageous effects described in 1) to 3) in the first embodiment, the following advantageous effects are obtained.

4) The discharge circuit 60 is provided. The discharge circuit 60 discharges the capacitors that constitute the smoothing circuit 28 when the power feed line Lp2 is interrupted by the energization control circuit 50 serving as the power supply breaker so as to cut off the energization.

Even after the power feed line Lp2 is interrupted so as to cut off the energization, electric charge remains in the capacitors connected to the power feed line Lp2, which causes a delay in decrease of the voltage applied to the pre-driver 22 and, as a result, stopping the energization through the power line Lp1 may delay. In particular, when an electrolytic capacitor is used, leakage current between the terminals is small and therefore, the above tendency becomes further significant.

However, with the above configuration, the influence of electric charge remaining in the capacitors is eliminated and it is possible to quickly decrease the voltage applied to the pre-driver 22 after the energization through the power feed line Lp2 is interrupted. By so doing, it becomes possible to set the output level of each gate driving signal to "Lo" without delay to further quickly stop the energization through the power line Lp1.

5) The discharge circuit 60 is configured to be able to discharge the capacitors 38*d*, 38*e*, and 38*f* connected to the low-potential side branch lines 35*d*, 35*e*, and 35*f* in the power feed line Lp2. In the switching arms 30*u*, 30*v*, and 30*w* that constitute the driving circuit 20, the FETs 30*d*, 30*e*, and 30*f* arranged at the low-potential side are turned on at a gate voltage that is lower than that of the FETs 30*a*, 30*b*, and 30*c* arranged at the high-potential side. Therefore, in the pre-driver 22, the gate driving signals output from the low-potential side driver circuits 33*d*, 33*e*, and 33*f* are set to "Hi" at a lower applied voltage. As described above, by discharging the capacitors 38*d*, 38*e*, and 38*f* connected to the low-potential side branch lines 35*d*, 35*e*, and 35*f*, it is possible to effectively suppress a delay in stopping the energization through the power line Lp1. As a result, it is possible to further simplify the circuit configuration to reduce the size of a substrate, and it is also possible to reduce the manufacturing cost.

Note that the above embodiments may be modified into the following alternative embodiments.

In the above embodiments, the invention is embodied as the ECU 11 that serves as the motor control device for controlling the operation of the motor 12 that serves as the driving source of the EPS actuator 10. However, the invention is not limited to the above embodiments, but the invention may be applied to another application than the EPS.

In addition, the type of EPS is not limited to a column assist-type; it may be of a pinion assist-type or a rack assist-type.

Furthermore, for example, the invention may be applied to another vehicle steering system than the EPS as long as the vehicle steering system has a motor that drives the steering system, such as a transmission ratio device.

In the above embodiments, the FETs 30*a* to 30*f* (MOSFETs) are used as the switching elements that constitute the driving circuit 20. However, the invention is not limited to the above embodiments; another type of transistor may be used as long as the transistor is turned on and off by a driving signal output from the pre-driver.

In the above embodiments, the ECU 11 controls a brushless motor that is rotated with three-phase (U, V and W) driving electric power supplied thereto. However, the invention is not limited to this configuration; the invention may be applied to a motor control device for a brush direct-current motor. Note that the driving circuit in this case can employ a known configuration, in which the switching elements that are turned on and off by a driving signal output from the pre-driver are connected in an H-bridge arrangement, that is, two switching arms are connected in parallel with each other.

In the above embodiments, the step-up circuit 27 is formed by providing the charge pump circuits 37*a* to 37*f* respectively in the branch lines 35*a* to 35*f* that constitute the power feed line Lp2. However, the invention is not limited to the above embodiments; the step-up circuit 27 may be formed of a step-up element other than the charge pump circuits 37*a* to 37*f*, for example, a flyback circuit that uses a coil.

In addition, a step-up element is not necessarily provided in each of the branch lines 35*a* to 35*f*. That is, for example, a configuration, in which a voltage stepped up by one step-up circuit is applied to the pre-driver 22, a configuration, in which a plurality of step-up circuits are switched while the stepped-up voltage is applied to the pre-driver 22, or a configuration, in which a step-up voltage is applied to only a high-potential side driver circuit, may be employed. The smoothing circuit in this case as well may be formed by connecting a capacitor at a necessary portion.

In the above embodiments, the electrolytic capacitor is used for the smoothing circuit 28. However, the invention is not limited to this configuration; instead, the smoothing circuit 28 may be formed of a capacitor of the other type, such as a ceramic capacitor, or any combination of capacitors including an electrolytic capacitor.

In the above first embodiment, the semiconductor relay is used as the relay circuit 40; instead, a contact-type relay circuit may be used.

In addition, in the second embodiment, the circuit configuration of the energization control circuit 50 that constitutes the power supply breaker is also not limited to the one shown in FIG. 6.

The circuit configuration of the discharge circuit 60 is also not limited to the one shown in FIG. 6.

In the second embodiment, the discharge circuit 60 is configured to be able to discharge the capacitors 38*d*, 38*e*, and 38*f* connected to the low-potential side branch lines 35*d*, 35*e*, and 35*f* in the power feed line Lp2. However, the invention is not limited to this configuration; it is also applicable that the capacitors 38*a*, 38*b*, and 38*c* connected to the high-potential side branch lines 35*a*, 35*b*, and 35*c* are configured to be dischargeable similarly. In addition, if there is a capacitor in which electric charge remains that causes a delay in decrease of voltage applied to the pre-driver 22, specifically, a capacitor connected to the power feed line Lp2 at a low potential side (ground side) with respect to the power supply breaker, the capacitor may be configured to be dischargeable. By so doing, it becomes possible to decrease voltage applied to the pre-driver 22 more quickly after the energization through the power feed line Lp2 is interrupted.

What is claimed is:

1. A motor control device comprising:
a driving circuit formed by connecting a plurality of switching elements;
a motor control signal output device that outputs a motor control signal;
a step-up circuit that steps up and outputs a power supply voltage; and
a pre-driver that outputs a driving signal corresponding to the motor control signal to each of the switching elements based on the step-up voltage output by the step-up circuit, wherein
the step-up circuit is provided in a power feed line of the pre-driver, the power feed line branching off from a power line that connects the driving circuit and a power supply, and wherein
a power supply breaker is provided in the power feed line, the power supply breaker capable of being controlled to interrupt the power feed line so as to cut off energization.

2. The motor control device according to claim 1, further comprising:
a voltage sensor that is provided in the power feed line, wherein
the power supply breaker is controlled to interrupt the power feed line when a voltage detected by the voltage sensor is lower than or equal to a predetermined threshold.

3. The motor control device according to claim 1, wherein
the driving circuit is formed by connecting, in parallel, switching arms each having two, high-potential side and low-potential side, switching elements connected in series with each other, wherein
the driving circuit has a detector that detects short-circuit failure in which the high-potential side and low-potential side switching elements are turned on at the same time in any one of the switching arms, wherein
the power supply breaker is controlled to interrupt the power feed line when the short-circuit failure is detected.

4. The motor control device according to claim 1, wherein
a capacitor is provided in the power feed line between the step-up circuit and the pre-driver, wherein
the power supply breaker is provided on the power supply side with respect to the capacitor, wherein
the power supply breaker discharges the capacitor when the power feed line is interrupted.

5. The motor control device according to claim 1, wherein
the power feed line branches off from the power line at a node, wherein
the power supply breaker is provided between the node and the pre-driver in the power feed line.

6. The motor control device according to claim 5, wherein
the power supply breaker is provided between the node and the step-up circuit in the power feed line.

7. The motor control device according to claim 1, wherein
the power supply breaker is not provided in the power line that connects the driver circuit and the power supply.

8. The motor control device according to claim 1, wherein
the power supply breaker is not capable of interrupting the power line.

9. A method of operating the motor control device according to claim 1, the motor control device further comprising a voltage sensor that is provided in the power feed line, and the method comprising the step of:
controlling the power supply breaker to interrupt the power feed line when a voltage detected by the voltage sensor is lower than or equal to a predetermined threshold.

10. A method of operating the motor control device according to claim 1, the driving circuit being formed by connecting, in parallel, switching arms each having two, high-potential side and low-potential side, switching elements connected in series with each other and the driving circuit having a detector that detects short-circuit failure in which the high-potential side and low-potential side switching elements are turned on at the same time in any one of the switching arms, and the method comprising the step of:
controlling the power supply breaker to interrupt the power feed line when the short-circuit failure is detected.

11. A computer-readable storage medium configured to store a program to operate the motor control device according to claim 1, the motor control device further comprising a voltage sensor that is provided in the power feed line, and the program causing the motor control device to perform the step of:
controlling the power supply breaker to interrupt the power feed line when a voltage detected by the voltage sensor is lower than or equal to a predetermined threshold.

12. A computer-readable storage medium configured to store a program to operate the motor control device according to claim 1, the driving circuit being formed by connecting, in parallel, switching arms each having two, high-potential side and low-potential side, switching elements connected in series with each other and the driving circuit having a detector that detects short-circuit failure in which the high-potential side and low-potential side switching elements are turned on at the same time in any one of the switching arms, and the program causing the motor control device to perform the step of:
controlling the power supply breaker to interrupt the power feed line when the short-circuit failure is detected.

* * * * *